(12) United States Patent
Starzynski

(10) Patent No.: US 9,009,947 B2
(45) Date of Patent: Apr. 21, 2015

(54) METHODS FOR MAKING A SENSITIVE RESONATING BEAM ACCELEROMETER

(75) Inventor: John S. Starzynski, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/451,449

(22) Filed: Apr. 19, 2012

(65) Prior Publication Data
US 2012/0227495 A1  Sep. 13, 2012

Related U.S. Application Data

(63) Continuation of application No. 12/751,157, filed on Mar. 31, 2010, now Pat. No. 8,176,617.

(51) Int. Cl.
*H04R 31/00* (2006.01)
*G01P 15/097* (2006.01)

(52) U.S. Cl.
CPC ................... *G01P 15/097* (2013.01)

(58) Field of Classification Search
USPC ........... 29/52.1, 594, 595, 609.1; 310/313 A, 310/313 B, 313 R; 333/150, 187, 193, 195, 333/196; 73/504.04, 514.12, 504.28, 73/504.29
See application file for complete search history.

(56) References Cited

U.S. PATENT DOCUMENTS

| | | | |
|---|---|---|---|
| 4,939,935 A | 7/1990 | Amand | |
| 5,176,031 A * | 1/1993 | Peters | 73/514.12 |
| 5,596,145 A * | 1/1997 | Albert et al. | 73/514.29 |
| 5,644,081 A | 7/1997 | Schwarz et al. | |
| 5,644,083 A | 7/1997 | Newell et al. | |
| 5,656,778 A * | 8/1997 | Roszhart | 73/504.04 |
| 5,668,057 A | 9/1997 | Eda et al. | |
| 5,894,090 A * | 4/1999 | Tang et al. | 73/504.02 |
| 6,032,531 A * | 3/2000 | Roszhart | 73/504.04 |
| 6,367,786 B1 * | 4/2002 | Gutierrez et al. | 267/136 |
| 6,553,836 B2 * | 4/2003 | Williams | 73/514.28 |
| 6,595,054 B2 * | 7/2003 | Paros et al. | 73/504.04 |
| 7,655,538 B2 | 2/2010 | Sawyer | |
| 2009/0241665 A1 * | 10/2009 | Novack | 73/514.29 |
| 2010/0095770 A1 * | 4/2010 | Hsu | 73/504.12 |

OTHER PUBLICATIONS

Schmidt, "Wafer-to-Wafer Bonding for Microstructure Formation," Proceedings of the IEEE, vol. 86, No. 8, Aug. 1998, 11 pp.

(Continued)

*Primary Examiner* — Paul D Kim
(74) *Attorney, Agent, or Firm* — Shumaker & Sieffert, P.A.

(57) ABSTRACT

A method of making a resonating beam accelerometer (RBA). In an example process, a proof mass device and resonators are created from a quartz material. A direct bond is formed between the proof mass and the resonators by applying a predefined amount of pressure at a predefined temperature for a predefined amount of time. One or more damping plates are created from a quartz material. A direct bond is formed between the damping plates and the proof mass device. The proof mass device is created by applying a predefined amount of pressure at pressure at temperature to two bases, two proof mass portions, and a flexure. The proof mass bases are on opposite sides of the flexure. The proof mass portions are on opposite sides of the flexure. A gap is present between the proof mass bases and the proof mass portions.

6 Claims, 2 Drawing Sheets

(56) References Cited

OTHER PUBLICATIONS

Search Report from counterpart European application No. 11151766.0, dated May 26, 2011, 3 pp.

Examination Report from counterpart European application No. 11151766.0, dated Jun. 10, 2011, 5 pp.

Response to Examination Report from counterpart European application No. 11151766.0, dated Jun. 10, 2011, filed Sep. 14, 2011, 8 pp.

* cited by examiner

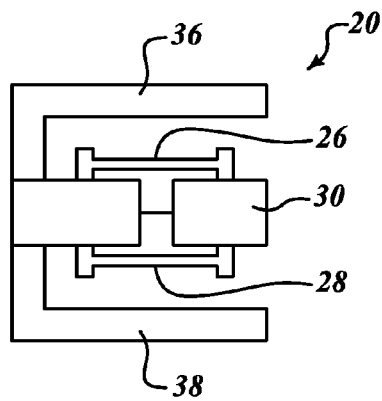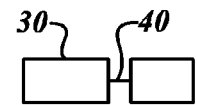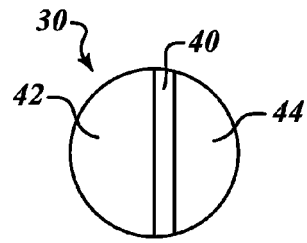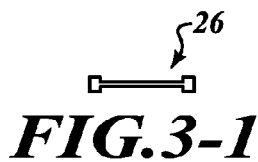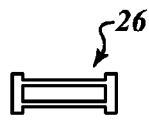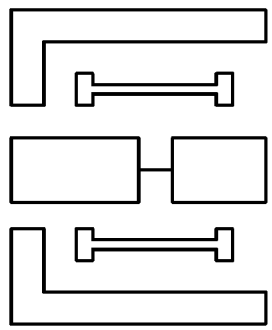

METHODS FOR MAKING A SENSITIVE RESONATING BEAM ACCELEROMETER

PRIORITY CLAIM

This application is a continuation of U.S. patent application Ser. No. 12/751,157 filed on Mar. 31, 2010 now U.S. Pat. No. 8,176,617 and is incorporated herein by reference.

GOVERNMENT INTEREST

The invention described herein was made in the performance of work under U.S. Government Contract No. FA9453-05-C-0241 awarded by Air Force Research Laboratories. The Government may have rights to portions of this invention.

BACKGROUND OF THE INVENTION

The sensitivity of an accelerometer can be degraded by creep of bonded joints. It can also be degraded by a difference in the coefficient of thermal expansion (CTE) between the bonding solder or glue and the bonded pieces.

The resonators and damping plates are typically attached employing either solder or glue. Glue, and to a lesser degree solder, may creep (the tendency of a solid material to slowly move or deform under the influence of stress), thus degrading the sensitivity of the accelerometer.

In addition, the sensitivity of an accelerometer can be degraded by machining imperfections in the proof mass hinge. Machining the hinge can introduce microcracking in the hinge, resulting in loss of accelerometer sensitivity and/or hinge failure.

One way to manufacture a hinge is to glue or solder a thin blank between four proof mass sections. Once again, creep of the solder or glue, as well as the CTE mismatched between the solder or the glue and the proof mass material, will degrade sensitivity.

SUMMARY OF THE INVENTION

The present invention provides a method of making a resonating beam accelerometer (RBA). In an example process, a proof mass device and resonators are created from a quartz material. A direct bond is formed between the proof mass and the resonators by applying a predefined amount of pressure at a predefined temperature for a predefined amount of time.

In one aspect of the invention, one or more damping plates are created from a quartz material. A direct bond is formed between the damping plates and the proof mass device by applying a predefined amount of pressure at a predefined temperature for a predefined amount of time.

In another aspect of the invention, the proof mass device is created by applying a predefined amount of pressure at a predefined temperature for a predefined amount of time to two proof mass bases, two moveable proof mass portions, and a flexure layer, thereby forming a direct bond between the parts. The proof mass bases are located on opposing sides of the flexure layer at one end of the flexure layer. The moveable proof mass portions are located on opposing sides of the flexure layer at another end of the flexure layer. A gap is present between the proof mass bases and the moveable proof mass portions.

BRIEF DESCRIPTION OF THE DRAWINGS

Preferred and alternative embodiments of the present invention are described in detail below with reference to the following drawings:

FIG. 1 is a side cross-sectional view of a resonating beam accelerometer (RBA) formed in accordance with an embodiment of the present invention;

FIGS. 2-1, 2-2 are top and side views of a proof mass used in the RBA of FIG. 1;

FIGS. 3-1, 3-2 are side and top views of a resonator that is used in the RBA shown in FIG. 1;

FIGS. 4-1, 4-2, 4-3 are side, bottom, and top views of a top damping device used in the RBA shown in FIG. 1;

FIG. 5 is an exploded view of the RBA of FIG. 1;

FIGS. 7-1, 7-2 are side views showing construction of a proof mass according to an alternate embodiment of the present invention.

DETAILED DESCRIPTION OF THE INVENTION

The present invention provides a sensitive resonating beam accelerometer (RBA) and a method for making a sensitive RBA. RBAs measure acceleration as a function of the frequency difference between two sets of vibrating quartz beams.

Figures 1, 2, 7:
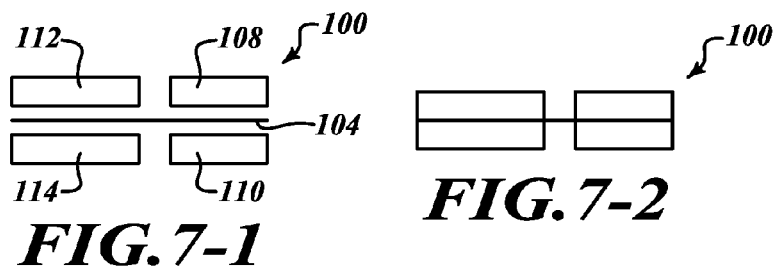

As shown in FIG. 1, an exemplary RBA 20 includes two sets of resonators 26, 28, a hinged proof mass 30, and two damping plates 36, 38. The damping plates 36, 38 damp out the oscillation of the proof mass 30. All the components are manufactured from the same type of material typically fused silica (amorphous quartz) or single crystal quartz.

FIGS. 2-1, 2-2 are top and side views of the proof mass 30. FIGS. 3-1, 3-2 are top and side views of the top set of resonators 26. FIGS. 4-1, 4-2, 4-3 are top, bottom, and side views of the top damping plate 36. FIG. 5 is an exploded view of the RBA 20.

The proof mass 30 includes a thinned region 40 that spans across two thicker portions 42, 44. The thinned region 40 acts as a bending point (flexure) for the end portions 42, 44 of the proof mass 30. The resonators 26, 28 are attached, perpendicular to the hinge, between each of the portions 42, 44 of the proof mass 30. The damping plates 36, 38 are attached to both the top and bottom sides of the stationary portion 42 of the proof mass 30. When the RBA 20 experiences an acceleration force, the movable portion 44 of the proof mass 30 will bend and one set of the resonators 26, 28 will increase in frequency and the other set will decrease in frequency. The magnitude of the acceleration is determined by these frequency changes.

Prior to assembly of the RBA components, the joining surfaces are polished. The parts are polished using standard mechanical glass polishing techniques. Then the surfaces are cleaned in a solution containing water, hydrogen peroxide, and ammonium hydroxide and then dried. The components are placed and held together at a predefined pressure of between 0.2 and 40 atmospheres with tooling (not shown) and heated to a temperature above 200° C. for several hours. Atoms from the components will interdiffuse and form a direct bond. This bond will not creep and if the joined parts are of the same material, there will be no CTE mismatch between the bond and the joined pieces. Direct bonding allows for joining of two materials without an intermediate layer as in soldering or gluing. The direct bond of two similar single-crystal materials results in the crystal lattices being joined together.

Figure 6:
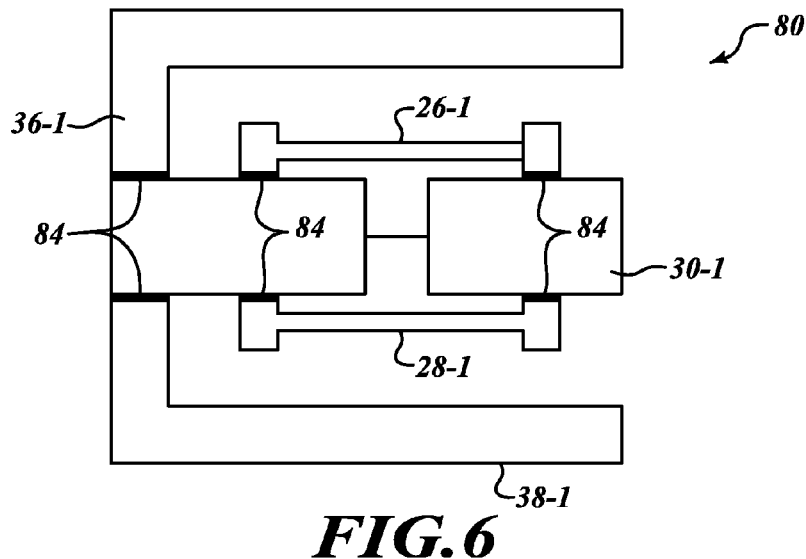
FIG. 6 illustrates direct bonds of an exemplary RBA.

As shown in FIG. 6, an RBA 80 has been assembled using direct bonding. Damping plates 36-1, 38-1 and resonators 26-1, 28-1 are direct bonded to a proof mass 30-1 according to the process described above. Direct bonds 84 now exist between the parts.

FIGS. 7-1 and 7-2 show exploded and assembled views of a proof mass 100 fabricated with direct bonding. The proof mass 100 includes five pieces: a hinge layer 104, between 0.001 to 0.010 inches thick; two proof mass ends 108, 110 between 0.050 to 0.250 inches thick; and two proof mass bases 112, 114 between 0.050 to 0.250 inches thick. The proof mass 100 is created by applying the direct bonding technique described above. The result is a direct bond created between the ends 108, 110, and bases 112, 114, and the hinge 104.

Figure 8:
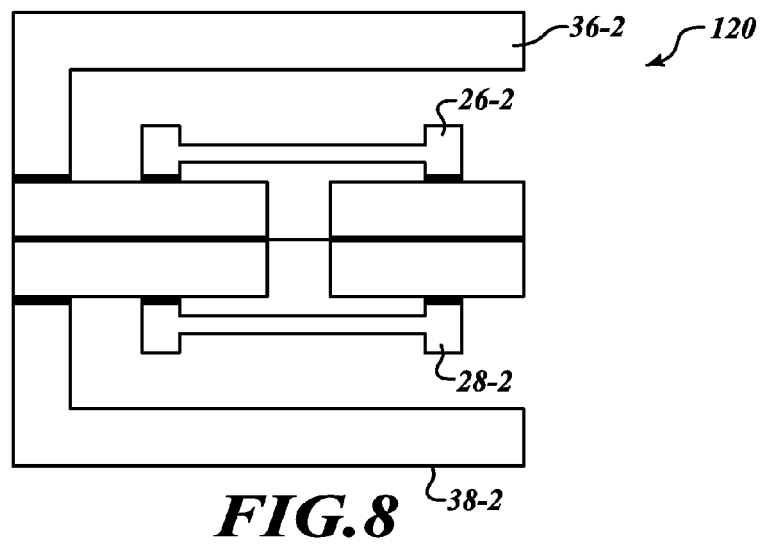
FIG. 8 is a side view of an RBA incorporating the proof mass of FIG. 7-2.

As shown in FIG. 8, an RBA 120 is assembled by employing direct bonding using the proof mass 100 shown in FIG. 7-2. Damping plates 36-2, 38-2 and resonators 26-2, 28-2 are direct bonded to the proof mass 100. The highlighted lines 124 indicate where direct bonds occur.

An example process for performing a direct bond includes placing the resonators, damping plates and proof mass into a tooling device that keeps all the parts in proper position. The tooling device also allows for pressure 10-50 lbs/in$^2$ to be applied between the parts. Then, temperature is raised over a two hour period to 450°, held at 450° for eight hours, then lowered to room temperature the last two hours. Only pressures and temperatures may be used in order to affect direct bonds to occur between like materials.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making a resonating beam accelerometer (RBA), the method comprising:
    creating a single proof mass from a first quartz material;
    creating at least two resonators from a second quartz material;
    placing the single proof mass and the at least two resonators in a tooling device configured to stabilize movement between the single proof mass and the at least two resonators; and
    applying, via the tooling device, a predefined amount of pressure at a predefined temperature for a predefined amount of time to the at least two resonators and the single proof mass, thereby forming a direct bond by interdiffusing between the single proof mass and each resonator of the at least two resonators,
    wherein the first quartz material has a coefficient of thermal expansion (CTE) that is within a threshold amount of a CTE of the second quartz material.

2. The method of claim 1, wherein the CTEs of the first and second quartz materials are identical.

3. The method of claim 1, wherein the CTE of the first quartz material is within the threshold amount of the CTE of the second quartz material such that there is no CTE mismatch at respective bonds between the single proof mass and each resonator of the at least two resonators.

4. The method of claim 1, wherein applying the predefined amount of pressure at the predefined temperature for a predefined amount of time to the at least two resonators and the single proof mass comprises joining of crystal lattices of the single proof mass and each resonator of the at least two resonators to form a direct bond by interdiffusing between the single proof mass and each resonator of the at least two resonators.

5. The method of claim 1, wherein the direct bond by interdiffusing between the single proof mass and each resonator of the at least two resonators joins the single proof mass and each resonator of the at least two resonators without solder or glue.

6. The method of claim 1, wherein the CTE of the first quartz material and the CTE of the second quartz material are substantially equal.

* * * * *